United States Patent Office 3,121,222
Patented Feb. 11, 1964

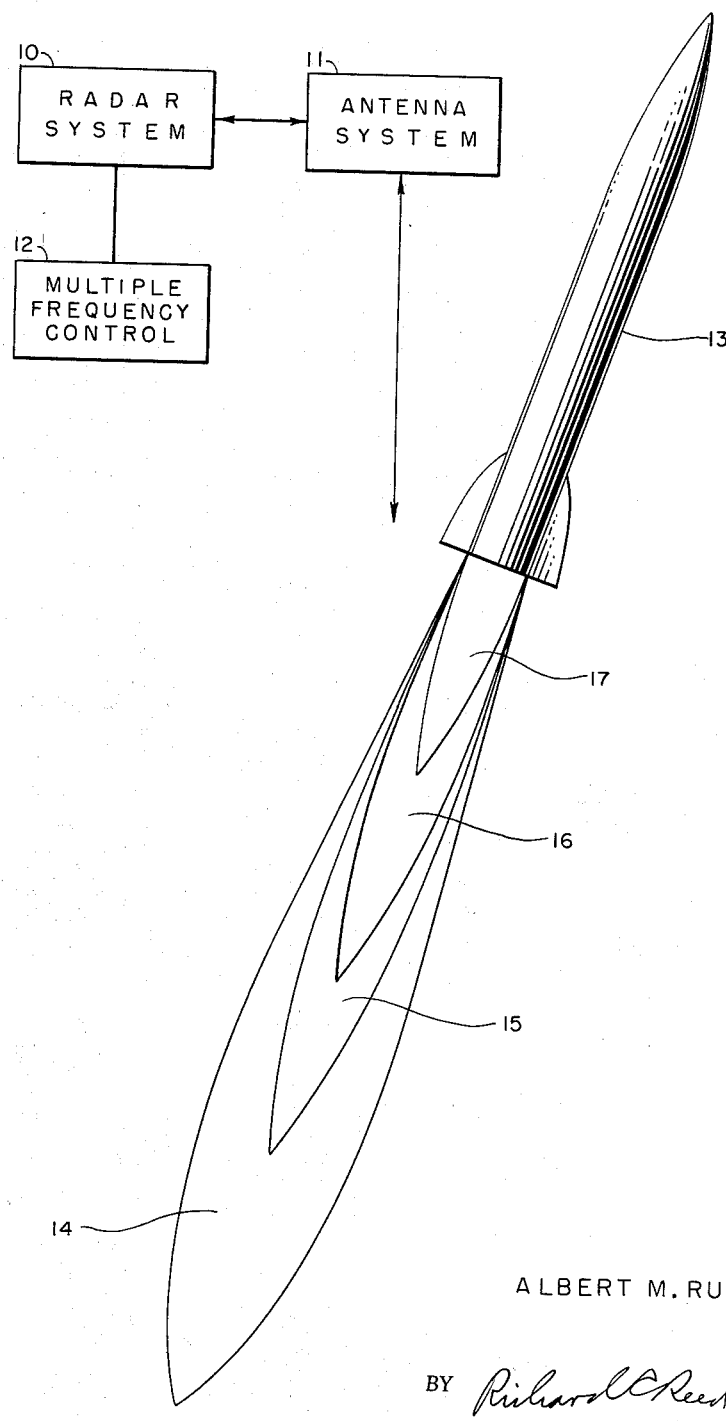

3,121,222
MISSILE LOCATOR SYSTEM
Albert M. Rubenstein, 2316 Colston Drive,
Silver Spring, Md.
Filed Apr. 30, 1959, Ser. No. 810,192
3 Claims. (Cl. 343—5)
(Granted under Title 35, U.S. Code (1952), sec. 266)

The invention described herein may be manufactured and used by or for the Government of the United States of America for governmental purposes without the payment of any royalties thereon or therefor.

This invention relates to object locator systems in general and in particular to detection systems for locating moving objects on the basis of the effect produced in a medium as a result of causes and effects of motion of such an object in the medium.

The detection of an object such as a ballistic missile to permit interception thereof is difficult not only because of the small size of such missiles in proportion to the detection range required but also because of their high speed which requires detection at extremely long ranges to provide adequate time in which to take effective counter action. As an example, missiles may travel 150 nautical miles per minute, requiring therefore only 10 minutes to travel 1500 nautical miles.

Conventional types of radar systems capable of the detection of typical long range missiles are not practical because of the requirements for excessively high transmitter power and large antenna aperture. Such a missile as that exemplified above may present a radar cross-section of 0.05 square meter. To detect such a target even as close as 500 miles requires a transmitter peak power of 2.5 megawatts and an antenna aperture of 1200 square feet.

Some other approach is therefore necessary to provide desired long range detection of missile by radar. A missile during propulsion and in flight produces a number of effects which change the propagational characteristics of the medium through which it is passing. Of particular significance are those which cause the medium to reflect electromagnetic energy by the production of charged particles. Where such reflection is of sufficient importance it is possible to detect the presence of a missile indirectly by radar systems which are not sufficiently powerful and sensitive to locate the missile directly.

An important effect is the ionization cloud produced during the propulsion phase of missile flight. Such a phase may last several minutes during which flame and products of combustion are emitted in highly ionized condition in large quantities. The persistence of such an ionized condition is a function of many variables, however it may last several seconds at any one point in the trail before recombination occurs.

Another important effect is the production of thermionic and thermal emission of electrons as the skin of the missile becomes heated by friction as it passes through the atmosphere. Such electrons also recombine after the passage of the missile however they exist for a finite period.

Effects such as the foregoing produce a cloud or trail extending in back of the missile which is more highly ionized near the missile but which diminishes in ionization density with time after the passage of a missile.

It is characteristic of electromagnetic energy that it can be reflected by such ionized clouds however, a greater ionization density is required to reflect energy of higher frequency. Thus a principle can be evolved by means of which low frequency energy can be used to obtain reflection from a long trail which can be several thousand feet or even miles in length and hence provides a large reflected signal to indicate that a missile has been launched but which is not extremely accurate as to indicating the exact position of the missile. When a launch has been detected and the general direction thereof thus established, with the missile presumably moving closer toward the radar site, it is then possible to shift to higher frequency operation at which only a small portion of the cloud which is much closer to the missile and most highly ionized is effective to produce return energy.

Accordingly it is an object of the present invention to provide apparatus capable of detecting missiles at long range.

Another object of the present invention is to provide a method of detecting missiles at long range.

Other objects and many of the attendant advantages of this invention will be readily appreciated as the same becomes better understood by reference to the following detailed description when considered in connection with the accompanying drawings wherein;

The single figure of the drawing shows a typical embodiment of the features of the present invention.

With reference now to the drawing, the apparatus shown therein constitutes a typical embodiment of features of the invention, wherein reference numerals 10 indicate a radar system, 11 an antenna for that system, and 12 a multiple frequency control device by means of which the radar system may be caused to operate at selected frequencies. Numeral 13 indicates a distant guided missile in flight with the trail therefrom indicated at various regions 14, 15, 16, 17 which are not necessarily sharply defined but which indicate regions of progressively higher ionization density near the missile.

The radar system 10 and antenna 11 may be conventional in nature except for the requirement that they be tunable or operable over a wide range, typically 50 to 300 megacycles per second. In various applications this tuning can be accomplished in several ways, either continuous or in a plurality of steps. It is likewise possible to use a radar system 10 having a plurality of radio frequency sections and a plurality of antenna apertures or elements should such be desirable to minimize the problems presented by the wide bandwidth required.

The multiple frequency control 12 is any suitable device which may be manually or automatically operated to cause the radar system 10 to operate at the various frequencies involved. In its simplest form it could be a switch, in more elaborate forms, variable frequency exciters or the like. The principle requirements for this device is that it be capable of causing the operation of the radar system at the low frequency of 50 megacycles per second until such time as a missile launch is detected following which it can cause the operation of the radar system at a higher frequency to obtain more precise location of the missile.

The antenna 11 is preferably of the directive type having a narrow beam width and in which the beam may be oriented to point in selectable directions. As a general proposition it may be advantageous in some instances to have a broader beam for the lower frequencies of operation than for the higher frequencies. Such is readily obtainable with a parabolic antenna and can provide greater angle coverage for early warning detection without excessive loss of sensitivity because of the large areas of missile trail effective in returning radar energy at the lower frequencies.

An approximation of the behavior of the missile trail in the reflection of radar signals may be obtained from certain mathematical relationships as explained in the following:

Since electrons are the principal cause of the reflection of electromagnetic energy by the missile trail, an approximation may be made that the reflection characteristics of the trail are to a first approximation determined by the electron density in the trail. Then the electron density (N) for critical reflection is given by the equation $$N = \frac{m\pi f^2}{9e^2} \times 10^{15}$$

$$= \frac{f^2}{81} \times 10^{-6}$$

where:

$f$=frequency in cycles per second
$N$=ionization density in electrons/cc.
$m$=mass of electron in kilograms
$e$=electron charge in coulombs Since the missile trail expands as a function of time, if the critical density conditions are not attained, then the energy scattered from the individual wavelets must be vectorially added to obtain an equivalent reflection coefficient. It is, however, desirable to select a frequency which will permit critical density to be attained.

If critical density is attained and the size of such region occupies an appreciable portion of a square wavelength, preferably a Fresnel zone, then the standard radar equation is applicable, which is $$P_R = \frac{\lambda^2 P_T G^2 S}{(4\pi)^3 R^4}$$

where:

$P_R$=received power in watts
$P_T$=power transmitted in watts
$G$=antenna gain
$S$=radar cross-section in meter$^2$
$R$=range in meters
$\lambda$=wavelength in meters From the foregoing it is seen that the lower frequencies of operation offer advantages in increasing the range at which reflection can be obtained, however there are several practical considerations which are involved. The low frequencies require larger antennas which are not desirable if they are to be mounted on a movable platform such as a ship or aircraft. On the other hand, there is no particular advantage to lowering the frequency to such an extent that the critical reflection is not obtained for a substantial portion of a Fresnel zone. Additionally the lower frequencies are subject to auroral echoes and to echoes from the E and F layers of the ionosphere. The minimum radar frequency ($f_{min}$) should satisfy $$f_{min} > 3.6 f^1 c$$

where $f^1c$ is the critical frequency for the ionosphere.

From electron concentration of the order of $10^6$ electrons per cc. this frequency is approximately 12 megacycles per second, thus $f_{min}$=43.2 megacycles per second.

Thus as a practical matter, low frequencies of the order of approximately 50 megacycles per second and high frequencies of the order of 300 megacycles per second are optimum. It is to be understood of course that desirable results can be obtained with somewhat different frequencies, depending upon the specific results desired. For example, desirable results can be obtained with low and high frequencies of 70 and 150 megacycles per second.

In certain geographic regions where aurora and other environmental factors are not limitng, lower frequencies of the order of several kilocycles per second could be used in detecting ionization trails of lower density. In such cases reflection from the ionosphere or "skip" could even be used to advantage to extend the range of detection.

The antenna system can also be modified considerably in accordance with the teachings of the present invention. In some instances for example it may be advantageous to use omnidirectional antennas at least for the low frequencies to achieve simultaneous coverage in all directions, in which instance, a system of triangulation would provide directional information. Thus it is contemplated that the antenan system could have separate groups of elements for transmission and reception and that some of one or both groups could be separated by substantial amounts of space.

As the term location is employed herein it is understood applicable to tracking and identification as well.

Obviously many modifications and variations of the present invention are possible in the light of the above teachings. It is therefore to be understood that within the scope of the appended claims the invention may be practiced otherwise than as specifically described.

What is claimed is:

1. In combination, a radar object detector system operable at a plurality of frequencies, a first of which is reflectable by the low ionization density portions of a missile trail, and a second of which is reflectable only by the portions of a missile trail having substantially higher ionization density, and means for changing the frequency of operation of said radar system from said first frequency to said second frequency following the detection of a missile launch whereby a more precise location of the missile may be obtained.

2. In combination, a radar object detector system operable at a first frequency of the order of 50 megacycles per second and a second frequency of the order of 300 megacycles per second, and means for changing the frequency of operation of said radar system from said first frequency to said second frequency following the detection of a missile launch whereby a more precise location of the missile may be obtained.

3. A method of determining the approximate location of missiles comprising, emitting electromagnetic energy of a first frequency sufficiently low to be reflected by the low ionization density portions of a missile trail continuing emission at said first frequency until reflections from a missile trail are detected, receiving echoes of the electromagnetic energy so reflected, determining the location of such trail from such received echoes, changing the frequency of said emitted electromagnetic energy to a second frequency reflectable only by the portions of a missile trail having substantially higher ionization density, receiving echoes at the second frequency of the electromagnetic energy so reflected, and determining the location of the trail portions in proximity to said missile from such last named received echoes.

References Cited in the file of this patent

UNITED STATES PATENTS

| 2,682,043 | Longacre | June 22, 1954 |
| 2,822,536 | Sandretto | Feb. 4, 1958 |
| 2,871,344 | Busignies | Jan. 27, 1959 |

FOREIGN PATENTS

| 696,202 | Great Britain | Aug. 26, 1953 |

OTHER REFERENCES

Sifford, B. M., and Vincent, W. R.: "Meteor Burst Provide Communications Path," Electronics, Aug. 29, 1958, pp. 42–45.

Physical Review, September 1926, vol. 28, p. 554, "A Test of the Existence of the Conducting Layer," by Breit and Tuve.

Aviation Week, June 17, 1957, p. 96, Meteor Burst Extends VHR Radio Range, by Philip Klass.

Eshleman, V. R.: "Theory of Radio Reflections From Electron-Ion Clouds," I.R.E. Transactions—Antennas and Propagation, January 1955, pp. 32–39.

Klass, P. J.: "Meteor Burst Extends VHR Radio Range," Aviation Week, June 17, 1957, pp. 96–101.